J. BOOTH.
SPINNING SPINDLE AND SUPPORT THEREFOR.
No. 10,884. Reissued Nov. 29, 1887.
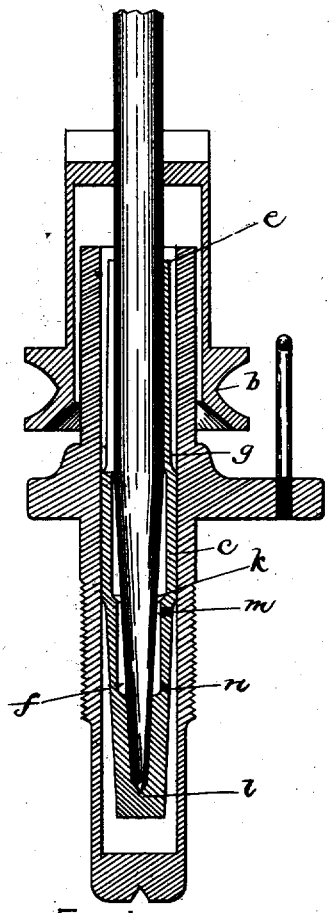
Fig. 1.
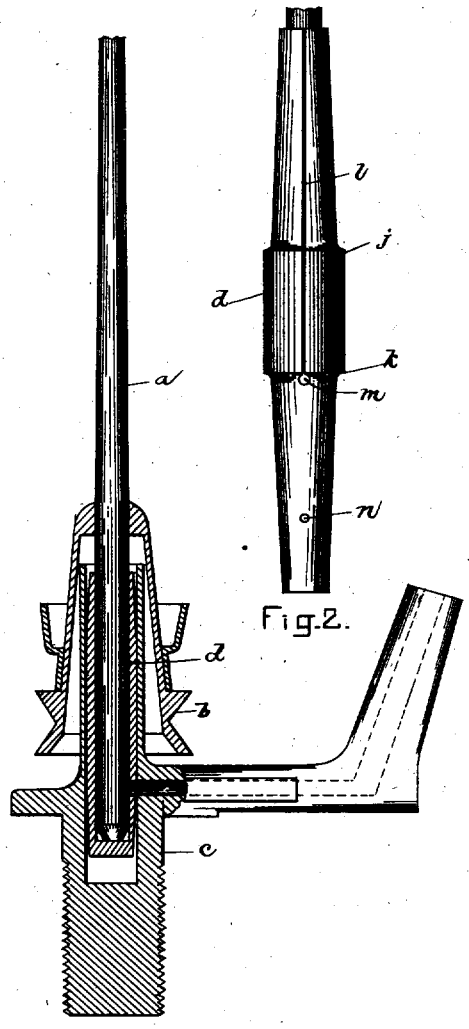
Fig. 3.
Fig. 2.
WITNESSES:
H. Brown.
A. D. Harrison.
INVENTOR:
John Booth,
by Wright, Brown & Crosby,
Attys.
N. PETERS, Photo-Lithographer, Washington, D. C.

UNITED STATES PATENT OFFICE.

JOHN BOOTH, OF CENTRAL FALLS, RHODE ISLAND.

SPINNING-SPINDLE AND SUPPORT THEREFOR.

SPECIFICATION forming part of Reissued Letters Patent No. 10,884, dated November 29, 1887.

Original No. 359,342, dated March 15, 1887. Application for re'ssue filed March 30, 1887. Serial No. 233,078.

*To all whom it may concern:*

Be it known that I, JOHN BOOTH, of Central Falls, in the county of Providence and State of Rhode Island, have invented certain new and useful Improvements in Spinning-Spindles and Supports therefor, of which the following is a specification.

My invention relates to spindles and supports therefor for spinning-frames and analogous machines, and has for its object to provide a construction whereby the bolster may be rigidly secured in the bolster-case and at the same time the spindle be permitted to have the requisite lateral motion to accommodate itself to uneven strain from any cause or to an unevenly-loaded bobbin.

It is also the object of the invention to provide a construction whereby the spindle may, if desired, be lubricated entirely with water.

It is also the object of the invention to provide other improvements in the devices mentioned, incidental to the foregoing.

In order to enable others skilled in the art to make and use my invention, I will now proceed to describe the same, having reference to the accompanying drawings, forming a part of this specification, the invention being particularly pointed out and distinctly claimed at the end of the description of its construction and operation.

Of the drawings, Figure 1 represents a twisting-spindle and its adjuncts embodying my invention, all of the parts excepting the spindle being shown in longitudinal vertical section. Fig. 2 is a side view of my improved bolster. Fig. 3 is a view, partly in vertical section, of a top spindle and its appurtenances having my improvements applied thereto.

Similar letters of reference indicate corresponding parts in all of the figures.

In the drawings, having reference to Figs. 1 and 2, *a* represents a spindle, *b* a sleeve-whirl, and *c* a bolster-case, of common form and construction as employed in certain types of spinning or twisting frames.

*d* represents the bolster, constructed of hard or vulcanized rubber, provided with a longitudinal bore of uniform diameter between the upper end, *e*, and the point *f*, excepting for that portion between the letters *g* and *h*, where it is somewhat enlarged, for a purpose to be presently explained. From the point *f* to the point *i* said bore is given a tapering form to fit the lower end and foot of the spindle.

The bolster *d*, for a portion of its length at or near its center, as between the points indicated by the letters *j* and *k*, corresponding, as shown, substantially to the point at which the bore of the bolster is enlarged, as aforesaid, is uniform in circumference, which circumference is such as to make the bolster fit rigidly in the bore of the bolster-case when forced therein, as it is designed in practice to be. Between the point *j* and the top of the bolster and the point *k* and the bottom thereof the bolster is given a tapering form exteriorly, as clearly shown in Fig. 2, so as not at these points to bear or touch against the sides of the bore of the bolster-case, as shown in Fig. 1. It is obvious, however, that the exterior form of the bolster need not be tapering at the points mentioned, as any other shape or relationship of parts that will keep the bolster from bearing against the bolster-case at the points mentioned would answer.

The term "rigid" is herein employed in its general sense, and is intended to distinguish between the manner in which I secure my bolster in its case and the manner usually adopted, which is that of dropping the bolster loosely in its case, or so that, unless held from rotating, as it commonly is, whether it is allowed lateral play or not, it will or may be turned by the turning of the spindle. The relationship of the bolster to the bolster-case at the point at which the former is rigidly secured in the latter, which point is intermediate of the ends of the bolster, is such as that which they would have if integrally connected.

The diameter of the spindle, when inserted in the bolster between the points *g* and *e*, is uniform with the diameter of the bore of the latter between the same points, or such that the spindle will fit snugly within the bolster at such points, though not so closely as to prevent it from turning with freedom therein. From the point *g* to the foot or bottom the spindle is tapering in form, the form of the bore of the bolster conforming, as stated, to the diameter of the spindle between the points *f* and *i*.

A slit or kerf, *l*, is formed in the bolster through one side thereof, from the top *e* to the point *j*, from which latter point it extends as a groove in the outside of the bolster to the point *k*, where it intersects with a hole, *m*, extending through the bolster to the interior thereof.

By the construction described I am enabled to secure the bolster in the bolster-case in a rigid manner, as described, and at the same time, by reason of the elastic properties of the material composing the bolster, allow sufficient lateral play to the spindle to permit it to find its true center of rotation when subjected to an uneven strain or uneven load resulting from any cause.

As is well known, water affords the best lubricant for iron or steel and vulcanized rubber having surfaces moving in frictional contact with each other. By my invention I am therefore enabled to employ water as a lubricant for spindles instead of oil, by which I effect a great saving in the operation of spinning-frames, the space between the bolster and the bolster-case at the upper end thereof and between the spindle and the interior of the bolster toward the lower end of the latter affording a receptacle for a bountiful supply of water for the purpose mentioned.

The kerf *l* formed in the bolster permits of the thorough lubrication of the spindle in the upper portion of its bearings, and the groove extending down from the kerf *l* to the hole *m* permits the lubricant drawn upward by the rotation of the spindle to return to the lower part of the bolster to lubricate the spindle-step.

I prefer to form a hole, *n*, in the bolster, near the step or at the top of the step-bearing, for the purpose of admitting freely the lubricant to the step at this point. I prefer, also, to dissolve a little sal-soda or other similar chemical in the water used to lubricate my spindle, for the purpose of preventing the water from rusting the metal and at the same time improving the former as a lubricant.

Although I prefer to employ water as a lubricant in the operation of my invention, as being in several respects superior to oil, in addition to being cheaper, I am not in any sense confined thereto, as oil or other lubricant may be used with the same results as in spindles and their supports as heretofore constructed.

In Fig. 3 I have shown my invention as applied to a different form of spinning-spindle. The only difference between this construction and that shown in Figs. 1 and 2, is in the form of the spindle within the bolster and the interior bore of the latter, the interior bore of the bolster being in uniform diameter throughout, as is also the spindle, the edges of the foot of which are beveled, allowing said foot to be stepped on the flat surface forming the bottom of the interior bore of the bolster. In this instance, as in that already described, the bolster is forced into the bolster-case, so as to become rigidly fixed therein, the slight beveling of the upper and lower ends of the bolster exteriorly and the elastic character of the hard rubber comprising the bolster permitting of the slight lateral play of the spindle in finding its true center of rotation.

Other changes may be made in the form and arrangement of the parts comprising my improvements, in order to make them meet the exigencies of particular cases, without departing from the nature or spirit of the invention, the essential features of which are the hard or vulcanized rubber bolster rigidly secured in the bolster-case, whereby I am enabled to provide for the necessary lateral play of the spindle in finding its true center of rotation, and a closed bolster-case and bolster of hard or vulcanized rubber therein of such construction as to permit the lubricant to be held in the bolster-case and be freely admitted to the bearing-surfaces of the spindle, whereby I may be permitted, if I so desire, to employ water as a lubricant.

While I have shown and described the step for the spindle as integrally connected with the bolster, I would have it understood that the mode of connection between the bolster proper and the step, the form of the step, and its relationship to the bolster or bolster-case constitute no part of my present invention, so that where reference is herein made to the bolster it is not meant to include the step.

Having thus described my invention, what I claim is—

1. A bolster-case combined with a bolster composed of hard or vulcanized rubber, having a section of considerable length at a point intermediate of its ends of enlarged circumference, said bolster being rigidly secured at said point of enlarged circumference in said bolster-case, substantially as and for the purpose hereinbefore set forth.

2. A bolster-case combined with a bolster composed of hard or vulcanized rubber, tapering at its upper and lower ends, with a section of considerable length at or near its center uniform in circumference, said bolster being rigidly secured at the point uniform in circumference in said bolster-case, as and for the purposes hereinbefore set forth.

3. A bolster-case having a bore of substantially uniform diameter, in combination with a bolster composed of hard or vulcanized rubber, slightly tapering exteriorly at its upper and lower ends, said bolster being rigidly secured in said bolster-case at the point between said exteriorly-tapering portions, as and for the purposes set forth.

4. A bolster-case having a bore of substantially uniform diameter, in combination with a bolster composed of hard or vulcanized rubber, slightly tapering exteriorly at its upper and lower ends and provided with a vertical groove exteriorly, as between the points *j* and *k*, and a hole or aperture below said groove, said bolster being rigidly secured in said bolster-case at the point between said exteriorly-tapering portions, as and for the purposes set forth.

5. A bolster-case combined with a bolster composed of hard or vulcanized rubber, having a section of considerable length at a point intermediate of its ends of enlarged circumference, said bolster being rigidly secured at said point of enlarged circumference in said bolster-case and having its bore enlarged at a point substantially corresponding to that at which it is rigidly fixed in the bolster-case, substantially as described.

6. A bolster-case combined with a bolster composed of hard or vulcanized rubber, rigidly secured in the bolster-case at a point intermediate of the ends of the bolster, as and for the purposes set forth.

7. The combination, with the spindle, of a bolster of hard or vulcanized rubber to support the same and a closed bolster-case in which the bolster is arranged, the diameter of the bore in the bolster-case being considerably greater at points than the circumference of the bolster to form a reservoir for the lubricant, and the bolster being provided with holes to admit the lubricant to the bearing-surfaces of the spindle, whereby a bountiful supply of water may be contained in the bolster-case and the spindle properly lubricated thereby, substantially as set forth.

In testimony whereof I have signed my name to this specification, in the presence of two subscribing witnesses, this 24th day of March, A. D. 1887.

JOHN BOOTH.

Witnesses:
WM. H. GOODING,
JAMES E. BOWEN.